April 26, 1966 C. BROZEK ETAL 3,248,136
FITTING ASSEMBLY FOR METAL TUBES
Filed July 21, 1964 2 Sheets-Sheet 1
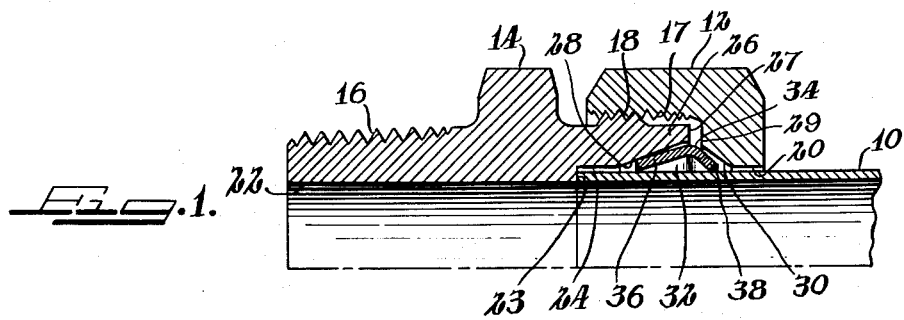
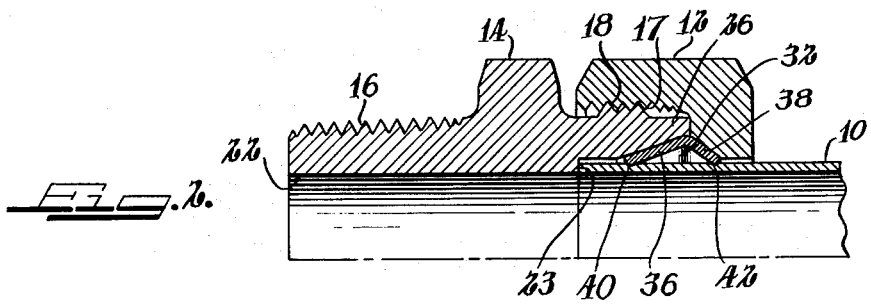
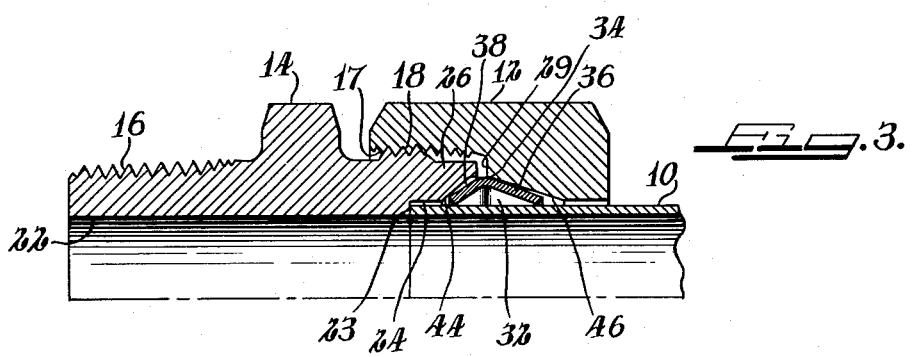
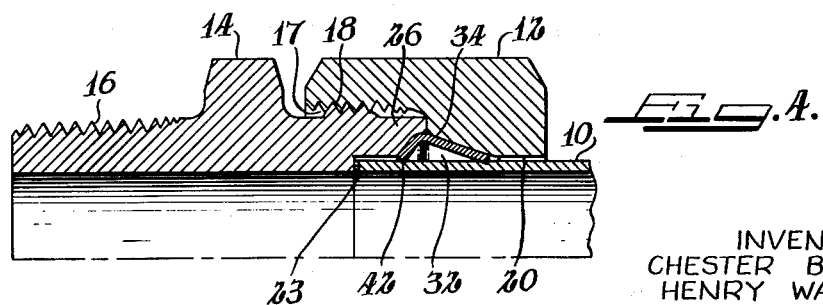
INVENTORS
CHESTER BROZEK
HENRY WAHOFF
BY
Horton, Davis, Brewer & Brugman
Attys.

INVENTORS
CHESTER BROZEK
HENRY WAHOFF

United States Patent Office
3,248,136
Patented Apr. 26, 1966

3,248,136
FITTING ASSEMBLY FOR METAL TUBES
Chester Brozek and Henry Wahoff, Chicago, Ill., assignors, by mesne assignments, to Chicago Fitting Corporation, Broadview, Ill., a corporation of Delaware
Filed July 21, 1964, Ser. No. 384,205
2 Claims. (Cl. 285—341)

This application is a continuation-in-part of application Serial No. 116,994, filed June 14, 1961, and now abandoned. This invention relates to high pressure tube fittings, in particular, to a tube fitting assembly having a minimum number of parts operable to anchor the fitting to the tube and to effect a fluid-tight seal therebetween.

Fittings of the above-stated category are generally known; however, previous efforts in this art have failed to provide a fully successful fitting which is adapted for use in operating conditions which subject the fittings and tubes to the combined environment of high temperatures, high pressures and vibrational forces. Previously known fittings, capable of positively locking and sealing a tube in position under the above-mentioned conditions, have been undesirably deficient in their ability to afford easy removal of the tube and fitting while avoiding unwanted or accidental release thereof and/or disruption of the necessary seal between tube and fitting in the presence of vibrational forces. Of still further difficulty in this field is the heretofore experienced inability to properly torque or turn up the fittings an amount necessary to insure proper sealing and locking operation thereof, unless great care or elaborate equipment is employed. Thus previous fittings of the class to which the present invention pertains, have been markedly susceptible to under or over torquing, either or which conditions results in unsatisfactory operation of the fitting, particularly as to its sealing function.

The present invention, in brief, avoids the above-outlined difficulties by a unique combination of features and elements, particularly distinguished by dependability in operation and simplicity in structure. In general, the improved fitting of this invention comprises a three-piece assembly; namely, a male fitting member which threadedly interconnects with a female fitting member and which two members define an annular internal chamber with the exterior of a tube to be sealed and held by the fitting. Such chamber is variable in volume, particularly in axial dimension, according to the relative positioning of the fitting member and serves to receive and confine a unitary combined, locking, sealing and anchoring ring member. Engagement of the chamber walls with the unitary ring member serves to deflect the same under axial and radial forces to positively anchor the ring to the tube and effect a metal-to-metal liquid-tight seal between the tube and fitting members. Additionally the ring member frictionally engages and locks with at least one of the fitting members, much as a lock washer might, to prevent unthreading or disassociating movement thereof, thereby to maintain the sealed integrity and anchored condition of the fitting even under high vibrational stresses. Importantly the unitary ring member is of greater hardness than the tube and is provided with sharp annular anchoring edges which bite into the tube walls for anchoring purposes. Also such ring member is resilient and deflects to effect its anchoring operation but not permanently so. Thus upon release of the axial and radial forces applied to the ring by compression of the chamber, the ring will spring back to its initial formation and release the tube and fitting members. Since it is vital to proper operation of the unitary ring member for the axial and radial forces to be applied thereto according to predetermined values, means are accordingly provided for limiting such forces. Such limiting means in essence controls compression of the chamber by positively limiting axial movement of the fitting members toward one another. Therefore, when such limit is reached, proper and predetermined deflection of the unitary ring is achieved to insure its successful anchoring sealing and locking functioning and without overstressing so that it may resiliently spring back to its original form upon release.

A primary purpose of this invention is to provide a tube fitting of the type described in which a single unitary member performs combined anchoring, locking and sealing functions.

Another purpose is a tube fitting of the type described which is useful at high pressures.

Another purpose is a tube fitting of the type described which is useful at high temperatures.

Another purpose is a tube fitting of the type described which forms a positive but releasible anchor with the tube to be sealed and acts as a locking means for preventing disassociating movement of inter-connected fitting members under vibration.

Another purpose is a tube fitting of the type described using a pre-formed uninterrupted, annular combination anchor, seal and locking ring.

Another important object of this invention is to provide a tube fitting having a sealing and anchor ring which is operatively conditioned by axially and radially applied forces and which includes means for automatically determining the application of such forces at predetermined values requisite for proper sealing, anchoring and locking operation of said ring.

The above and other objects, features and purposes of this invention will appear in the ensuing specification, drawings and claims.

The invention is illustrated diagrammatically in the accompanying drawings, wherein:

FIGURE 1 is an axial half-section of the fitting of this invention in free position;

FIGURE 2 is an axial half-section of the fitting of FIGURE 1 in torqued or turned up position;

FIGURE 3 is an axial half-section, similar to FIGURE 1, of a modified form of fitting;

FIGURE 4 is an axial half-section, similar to FIGURE 2, showing the fitting of FIGURE 3 in the torqued position;

Figure 5:
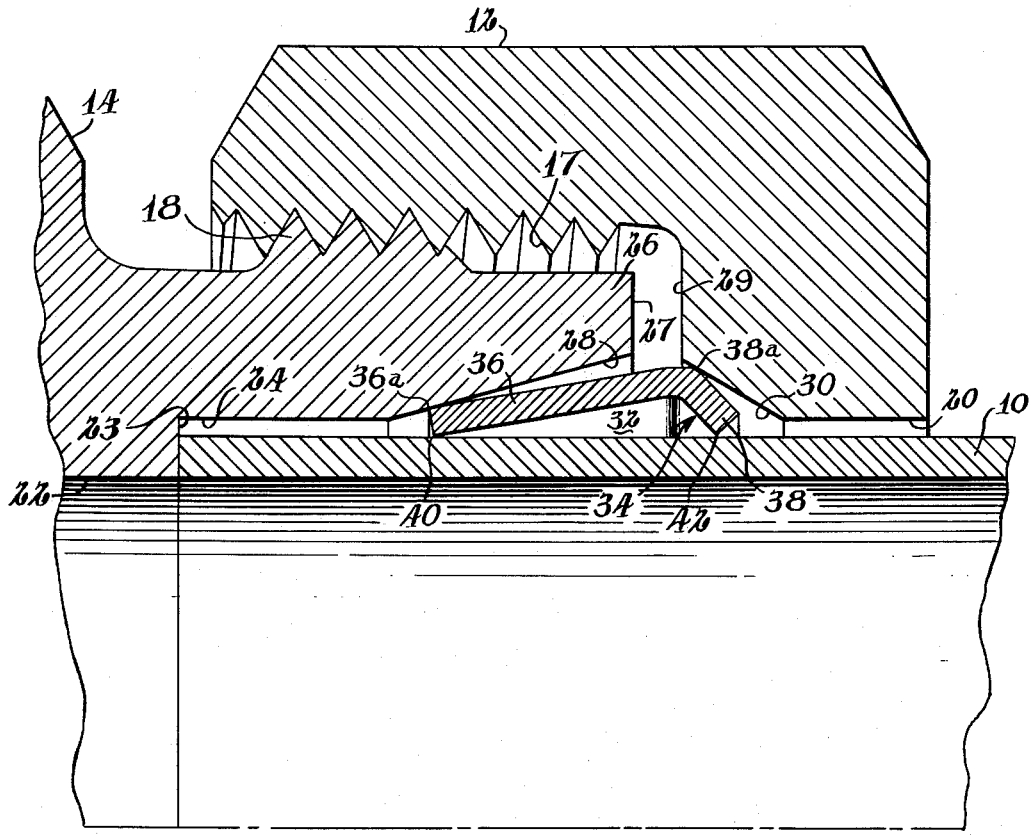
FIGURE 5 is an enlarged axial half-section similar to FIGURE 1.
Figure 6:
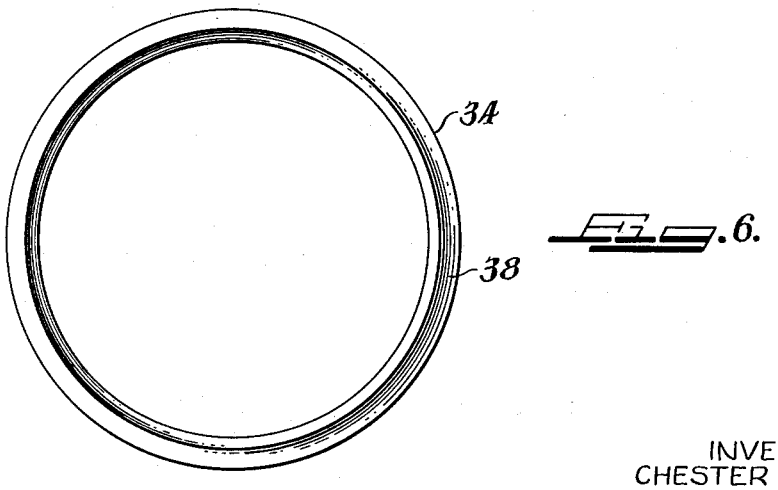
FIGURE 6 is a plan view of the anchor and seal ring used herein.

In FIGURES 1, 2 and 5, a tube to be sealed is indicated at 10 which may be any type of thin-walled tube which is used as a conduit for high pressure fluid, hydraulic, air or otherwise. The fitting of this invention by way of example includes a female nut member 12 and a male fitting member or nipple 14. The nipple 14 may be threaded, as at 16, for attachment to a suitable tank, reservoir, or the like. The nut 12 is internally threaded at 17 and the nipple 14 is formed with male threads 18 whereby the two members 12 and 14 are threadingly interjoined by relative rotation in a known fashion.

The nut 12 has a cylindrical bore 20 extending axially therethrough and which has a diameter slightly greater than the outer diameter of the tube 10 so that the nut may be easily positioned over the tube. The nipple 14 has an axial bore 22 with a diameter slightly less than the outer diameter of the tube 10, and has an annular stop shoulder 23 formed at one end of a counterbore portion 24 having the same general diameter as the bore 20. The stop shoulder 23 is effective to properly position the tube axially within the fitting, particularly nipple member 14.

The nipple 14 may have an annular axial extension 26 at one end which projects within the nut 12 and has an annular endwall 27 joined to counterbore 24 by an intervening slanted surface or conic wall 28. The nut 12 has an annular stop-shoulder 29 which opposes end wall 27 on the male fitting member 14 and which is joined to an intervening annular conic wall or slanted surface 30 which opposingly cooperates with the slanted surface 28 and the outer wall of the tube 10 to define a variable volume annular chamber 32 of substantially triangular cross-section.

Positioned within the chamber 32 is an uninterrupted annular combination anchor, seal and lock ring 34 which includes two conic wall portions 36 and 38 intersectingly arranged with their larger diameters adjacent and integrally joined. The anchor ring 34 is preferably pre-formed so that the surfaces of portions 36 and 38 are generally or slightly different angular dispositioned from the conic surfaces 28 and 30 of the chamber 32. The conic portions 36 and 38 oppose and mate with the surfaces or portions 28 and 30 in assembly and substantially conform to these surfaces when the fitting has been fully torqued or turned up, as shown in FIGURE 2. The anchor ring 34 also has two oppositely directed anchoring edges 40 and 42 at its opposite axial ends which edges are adapted to bite into the outer surface of the tube 10 for anchoring the ring to the latter when the fitting has been turned up.

The fitting is shown in a free or unanchored condition in FIGURES 1 and 5 with the annular unitary ring 34 positioned within the chamber 32. To turn up the fitting, the nut 12 is rotated on the nipple 14 to threadingly advance or move the nut toward the nipple member and thereby cause the conic chamber surfaces 28 and 30 to approach and engage the surfaces of ring portions 36 and 38. The initial points of contact between such mating surfaces are indicated at 36a and 38a in FIGURE 5. As the fitting members move toward each other, the conic surfaces 28 and 30 of chamber 32 gradually produce an axial and radial deflection of ring 34, forcing the sharp anchoring edges 40 and 42 at its opposite ends to bite into the outer surface of the tube to form two firm and positive anchors therewith.

The fitting is completely turned up or in the fully torqued position of FIGURE 2 and it will be noted that the conic surfaces 28 and 30 on the nipple and nut, respectively intersect when annular end wall 27 on the nipple abut shoulder 29 of the nut member and that such surfaces conformingly mate with the opposing surfaces of the portions 36 and 38 on the anchor ring. Such engagement between surface 28 and the conic exterior of portion 36 forms a positive, metal-to-metal, fluid tight seal between the fitting and the tube. Although the conic surface 30 may also be in a sealing relation with the surface of portion 38 there is no requirement for a seal at this point; it being preferred to have the longer pair of conic surfaces form the seal, as in FIGURE 2. However the engagement between surface 30 and portion 38 coupled with the positive anchoring of the ring member to the tube importantly provides a very effective frictional lock of the nut member 12, preventing its accidental or unwanted unthreading, once the fitting is fully turned up.

The shape of the anchor ring prior to contact and relative to the shape of the conic surfaces 28 and 30 is important. The pre-formed anchor ring's outer or conic surfaces are somewhat the same as the conic chamber forming surfaces on the fitting members, although there is a small difference. Initially, the surface of portion 36 forms a smaller angle with the axis of the tube than surface 28 while the surface of portion 38 forms a larger angle with such axis than surface 30. In this way, portion 36 initially contacts surface 28, as at 36a, radially adjacent the tube while the surface of portion 38 initially contacts surface 30, as at 38a, along a line radially outward of contact area 36a. There may be only about 2 to 4 degrees difference between the opposing ring portions and surfaces 28 and 30 but the arrangement shown is advantageous to provide good sealing contact between surface 28 and portion 36 and a good bite on the tube by the anchoring edges. Surface 28 will move toward the surface of portion 36, as surface 30, through contact at 38a, drives portion 36 toward such sealing contact. At the same time, both anchor ring edges are biting radially into the tube to be sealed. The anchor ring should preferably be formed of a material, for example a suitable steel, that is harder than the metal of the tube to be sealed and of sufficient resiliency such that even though there is considerable deflection of the ring as the fitting is turned up, the anchor ring will return to its original form when the fitting is released so as to be removable from the tube.

It is to be recognized in regard to the foregoing that the extending annular portion 26 of the male nipple member 14 radially surrounds the major axial length of the ring member 34 and that the apex or annular line of intersection between the angularly related conic ring portions 36 and 38 is located axially beyond shoulder 29 of the nut member and wholly radially inward of the latters' chamber wall surface 30. This arrangement effectively prevents the ring member from moving radially outward under axial deflection and thereby avoids any extrusion of the ring member into the annular spacing between wall 27 and shoulder 29 of the two fitting members. Thus positive radially inward anchoring deflection of the ring as well as positive abutting stop engagement between end wall 27 and stop shoulder 29 is assured. When such condition and positioning of parts is arrived at, the necessary predetermined forces for properly setting and sealing the ring member are achieved. Consequently a person applying the fitting of this invention knows that proper torquing of the fitting nut 12 to achieve optimum operation of ring 34 has been obtained whenever the stop shoulder 29 abuts end wall 27 and further advancing movement of the nut member thereby is prevented.

FIGURES 3 and 4 show a variant form of fitting in which like parts have been given the same numbers as in FIGURES 1, 2 and 5. The major difference between the form of FIGURES 1, 2 and 5 and that of FIGURES 3 and 4 is that the conic sealing surfaces, which are always the pair of slanted or conic surfaces closest to the end of the tube within the fitting are the shorter pair. The conic surface 44 on the nipple and the conic surface 46 on the nut are reversed as to length, when compared with the assembly in FIGURES 1, 2 and 5. In like manner, the anchor ring is reversed in its position within the chamber 32. As was true in the fitting of FIGURES 1, 2 and 5, in the fully torqued or turned up position, the single ring member seals and anchors the tube to the fitting assembly and effectively locks the fitting members against disassociating movement, unless proper torque is applied to back off the nut member.

The use, operation and function of the invention are as follows:

Shown and described herein is a high pressure tube fitting which provides a positive anchor, seal and lock with a minimum number of parts. The anchor ring functions both as an anchor, as a metal-to-metal seal and as a friction lock. In this connection, it is contemplated that a layer of a soft, malleable metal, for example, copper, on the outer surface of the metal anchor ring may be resorted to for improving the sealing function of the ring as well as its locking action with the fitting members. The inner surface of the anchor ring, however, at least those portions adjacent the anchoring edges, should be fairly stiff and hard, as it must be strong enough to bite into the outer surface of the tube and form a firm grip thereon.

The nipple and the nut each have a conic chamber forming surface which performs a deflecting function as well as a sealing function with the ring. As the fitting is turned up, the deflecting surfaces contact the conic surface portions on the anchor ring and drive the anchoring edges radially into the outer surface of the tube. The anchoring surfaces bite into the tube and the conic surfaces on the anchor ring gradually conform to the conic surfaces on the nut and nipple, thus forming the seal described above and locking the fitting members against unthreading rotation. These desirable operational conditions obtain when the fitting is properly torqued or turned up which is determined by engagement of the stop shoulder 29 and the end wall 27 of the two fitting members as heretofore explained.

Two forms of the invention have been shown and described. In both forms, the interior pair of slanted surfaces, or those closest to the end of the tube within the fitting, perform the sealing function. It is preferred to have the sealing conic surfaces longer, although they may be otherwise, for example, all the conic surfaces may be generally equal in length.

The fitting shown herein has been subjected to a number of very exhaustive tests. A static load of 32,000 p.s.i. was applied for 30 hours with no leakage at any time. A surge load of 5,000 p.s.i. was applied 40 times per minute for 2½ hours with the same result. A static load of 30,000 p.s.i. was applied intermittently between 10 separate loosenings and tightenings without any leakage. Finally, the fitting was given a so-called "shaker" test for 84 hours during which the fitting was vigorously vibrated or shaken. The aforesaid 5,000 p.s.i. surge load was applied during this period with 44 hours being the lead period. There was no leakage or loosening of the fitting members observed.

The unitary anchor ring itself is very important. Preferably, it is a relatively thin-walled hardened metal ring, generally no thicker than the tube to be sealed, and usually thinner. The ring is in the form of a double frustocone with the smaller diameter ends of the cones forming sharp anchoring or gripping surfaces. Because it is thin and hard, the anchor ring will vibrate and absorb any vibration imparted to the tube and fitting, and hence assist in preventing the fitting from becoming loose.

Because of the initial slight difference in angle between the conic surfaces on the nut and nipple and the conic surface portions on the anchor ring, the nut and nipple are held in place and the nut does not back off once it is turned up. The action of the ring is much like a lock washer in that the edges of the anchor ring which initially contact the nut and nipple as well as their conic surface portions are tightly pressed against the nut and nipple and serve as locking means to prevent unwanted relative rotation of those members, once the fitting is fully torqued.

Another advantage of the fitting is that no rubber material is used. Rubber has a tendency to extrude when subjected to extremely high pressures. Also, it can be damaged when the fitting is subjected to vibration. An additional disadvantage of rubber is that it cannot be subjected to extremely high temperatures. The fitting shown herein operates very satisfactorily at high pressures, high temperatures, and under vibration conditions.

Whereas the preferred form of the invention has been shown and described herein, it should be realized that various modifications, substitutions, and alterations may be made thereto within the scope of this invention and that the same is not to be limited by the herein described embodiments, except as may appear in the following appended claims.

We claim:

1. A three-piece fluid-tight tube fitting assembly composed of: a pair of threadingly interfitted, coaxially connectable and relatively movable male and female metal fitting members having an internal bore means coaxially receptive of one end of a cylindrical metal tube to be sealed, each member having one of a pair of intersectionally disposed, internal, annular, conic surfaces, which, with the external cylindrical surface of the tube mounted therein cooperatively define a variable volume annular chamber of substantially triangular cross-section about the tube; a spring-like, resilient, shock absorbing annular metal combination sealing, anchoring and locking ring, of unbroken unitary formation mounted about said tube within said chamber; said ring comprising a pair of intersectingly related annular conic wall portions of relatively thin cross-section integrally joined at their ends of greater diameter and each respectively opposing and angularly intersecting one of said annular conic surfaces whereby said portions are adapted to be engaged by said surfaces and resiliently deflected toward one another about their interjoined ends to produce impermanent axial and inward radial deformation of said ring in response to movement of said surfaces relatively toward one another upon compression of said chamber; an annular anchoring edge formed at the radially innermost end of each of said ring portions normal to the longitudinal axes of said conic wall portions and each edge being adapted to bite radially into the external surface of said tube and thereby axially anchor said ring and fitting members to the latter in response to predetermined deformation of said ring and compression of said chamber; and an annular axial terminal portion having an uninterrupted cylindrical exterior formed on one of said fitting members, concentrically contiguous to said conic surface thereof and extending axially therebeyond; said terminal portion having an annular end wall which is adapted to abuttingly engage an opposing annular shoulder formed within the other fitting member concentrically contiguous to the latter's conic surface for the purpose of limiting movement of said members toward one another to establish said predetermined compression of said chamber; said predetermined compression serving to conform at least the one of said conic portions with the opposing one of said conic surfaces nearest said one end of said tube thereby to effect a fluid tight seal between said one end of said tube and the fitting assembly while causing both of said conic portions to frictionally lock with both of said conic surfaces thereby to maintain said fitting members in positions establishing said chamber's predetermined compression.

2. The combination set forth in claim 1 wherein the line of integral junction between the larger diametered ends of said ring's conic portions is maintained wholly between one of said conic surfaces and said tube and axially away from the area of abutting engagement between said terminal portion and said shoulder portion, said area openly communicating with said chamber, whereby said ring is held totally within said chamber and is prevented from extruding between said terminal and shoulder portions as said members are moved toward each other.

References Cited by the Examiner

UNITED STATES PATENTS

| | | | |
|---|---|---|---|
| 2,255,673 | 9/1941 | McDermott | 285—382.7 |
| 2,522,785 | 9/1950 | Hanson | 285—341 |
| 2,648,550 | 8/1953 | Courtot | 285—382.7 |
| 3,003,795 | 10/1961 | Lyon | 285—341 |

FOREIGN PATENTS

| | | |
|---|---|---|
| 409,692 | 5/1934 | Great Britain. |
| 859,576 | 1/1961 | Great Britain. |

CARL W. TOMLIN, *Primary Examiner.*

R. E. SCOTT, T. F. CALLAGHAN, E. C. ALLEN, *Assistant Examiners.*